（12） United States Patent
Paromtchik et al.

(10) Patent No.: US 9,881,498 B2
(45) Date of Patent: Jan. 30, 2018

(54) METHOD AND SYSTEM TO ASSESS ABNORMAL DRIVING BEHAVIOUR OF VEHICLES TRAVELLING ON ROAD

(71) Applicant: Inria Institut National De Recherche En Informatique Et En Automatique, Le Chesnay (FR)

(72) Inventors: Igor Evguenyevitch Paromtchik, Corenc (FR); Christian Laugier, Montbonnot Saint Martin (FR)

(73) Assignee: INRIA INSTITUT NATIONAL DE RECHERCHE EN INFORMATIO, Le Chesnay (FR)

( * ) Notice: Subject to any disclaimer, the term of this patent is extended or adjusted under 35 U.S.C. 154(b) by 0 days.

(21) Appl. No.: 14/774,605

(22) PCT Filed: Mar. 12, 2014

(86) PCT No.: PCT/EP2014/054851
§ 371 (c)(1),
(2) Date: Sep. 10, 2015

(87) PCT Pub. No.: WO2014/140107
PCT Pub. Date: Sep. 18, 2014

(65) Prior Publication Data
US 2016/0035220 A1     Feb. 4, 2016

(30) Foreign Application Priority Data

Mar. 12, 2013    (EP) ..................................... 13305275

(51) Int. Cl.
*G08G 1/01*        (2006.01)
*B60W 50/12*       (2012.01)
(Continued)

(52) U.S. Cl.
CPC ........... *G08G 1/0137* (2013.01); *B60W 30/08* (2013.01); *B60W 40/09* (2013.01); *B60W 50/12* (2013.01);
(Continued)

(58) Field of Classification Search
CPC .... G08G 1/0137; G08G 1/0125; G08G 1/052; B60W 30/08; B60W 40/09; B60W 50/12;
(Continued)

(56) References Cited

U.S. PATENT DOCUMENTS 8,996,234 B1 *   3/2015   Tamari ................. G07C 5/0808
                                                           701/123
9,315,194 B2 *   4/2016   Okuda ................. B60W 50/12
(Continued)

FOREIGN PATENT DOCUMENTS

EP     2 289 754 A1     3/2011
EP     2 514 652 A1     10/2012

OTHER PUBLICATIONS

Measures of Skewness and Kurtosis, Engineering Statistics Handbook, Feb. 2013, 3 pages, Section 1.3.5.11—Retrieved from the Internet: URL: http://web.archive.org/web/20130220165012/http://www.itl.nist.gov/div898/handbook/eda/section3/eda35b.htm.

*Primary Examiner* — Bao Long T Nguyen
(74) *Attorney, Agent, or Firm* — Maynard, Cooper & Gale, P.C.; Brian Sattizahn

(57) ABSTRACT

The invention concerns a method for assessment of abnormal driving behavior to improve driving safety of a vehicle travelling on a road, using position information and motion information about said vehicle and/or at least one neighboring vehicle travelling in the proximity of said vehicle on said road. The method comprises a step of obtaining and memorizing (40, 42) a plurality of position information items and motion information items, each information item corre-
(Continued)

sponding to a measuring time instant of an observation time interval and a step of obtaining (44) at least one estimate of the reference value for said vehicle and/or its at least one neighboring vehicles travelling on said road during the observation time interval. Next, the sets of deviation values are computed (46), each deviation value being computed using a memorized information item corresponding to a measuring time instant and the at least one estimate of the reference value and the quantities of deviation are obtained from the corresponding sets of deviation values. If a quantity of deviation among said quantities of deviation is greater than a predetermined threshold for the corresponding driving behavior, the method implements (52) a measure for safety improvement.

18 Claims, 4 Drawing Sheets

(51) Int. Cl.
  *B60W 50/14*   (2012.01)
  *B60W 30/08*   (2012.01)
  *B60W 40/09*   (2012.01)
  *G08G 1/052*   (2006.01)
  *B60W 30/10*   (2006.01)
  *B60W 30/12*   (2006.01)
  *B60W 30/14*   (2006.01)
  *B60W 40/08*   (2012.01)

(52) U.S. Cl.
  CPC .......... *B60W 50/14* (2013.01); *G08G 1/0125* (2013.01); *G08G 1/052* (2013.01); *B60W 30/10* (2013.01); *B60W 30/12* (2013.01); *B60W 30/146* (2013.01); *B60W 2040/0818* (2013.01); *B60W 2050/146* (2013.01); *B60W 2520/10* (2013.01); *B60W 2530/14* (2013.01); *B60W 2540/18* (2013.01); *B60W 2550/302* (2013.01); *B60W 2550/306* (2013.01); *B60W 2550/308* (2013.01); *B60W 2550/402* (2013.01)

(58) Field of Classification Search
  CPC ......... B60W 50/14; B60W 2040/0818; B60W 2050/146; B60W 2520/10; B60W 2530/14; B60W 2540/18; B60W 2550/302; B60W 2550/306; B60W 2550/308; B60W 2550/402; B60W 30/085–30/0956; B60W 30/10–30/162; B60W 40/08; B60W 2050/143; B60W 30/17
  USPC .............................. 701/117, 93, 96, 98, 301
  See application file for complete search history.

(56)  References Cited

U.S. PATENT DOCUMENTS

| | | | |
|---|---|---|---|
| 2003/0193404 A1* | 10/2003 | Joao .................... | B60R 25/102 340/12.22 |
| 2005/0270145 A1* | 12/2005 | Kataoka .............. | B62D 15/029 340/435 |
| 2007/0139176 A1* | 6/2007 | Victor .................. | B60Q 9/008 340/435 |
| 2008/0084283 A1 | 4/2008 | Kalik | |
| 2011/0029184 A1* | 2/2011 | Brighenti .......... | B60W 30/0953 701/31.4 |
| 2011/0210867 A1* | 9/2011 | Benedikt ................. | G08G 1/01 340/905 |
| 2012/0019375 A1* | 1/2012 | Kataoka ................ | B60W 50/14 340/439 |
| 2013/0006513 A1* | 1/2013 | Nishiyama ........ | B60W 30/0953 701/301 |
| 2013/0135092 A1* | 5/2013 | Wu ...................... | B60K 28/066 340/439 |
| 2013/0226408 A1* | 8/2013 | Fung .................... | B60W 40/09 701/41 |
| 2013/0253767 A1* | 9/2013 | Lee ...................... | B60W 50/04 701/42 |
| 2013/0297196 A1* | 11/2013 | Shida .................. | B60W 30/143 701/119 |
| 2014/0309812 A1* | 10/2014 | Lee ....................... | H04L 67/12 701/2 |
| 2015/0070159 A1* | 3/2015 | Okuda ................ | B60W 40/08 340/439 |
| 2015/0258996 A1* | 9/2015 | Victor .................. | G09B 19/16 340/576 |
| 2015/0310145 A1* | 10/2015 | Nica ................... | G01M 17/007 703/8 |

\* cited by examiner

METHOD AND SYSTEM TO ASSESS ABNORMAL DRIVING BEHAVIOUR OF VEHICLES TRAVELLING ON ROAD

The present invention concerns a method and system to assess abnormal driving behaviour of vehicles travelling on a road and aims to improve driving safety.

The invention relates to a driver assistance system that monitors the vehicle's motion and its traffic environment, detects and tracks other vehicles travelling on the road to quantify abnormal driving behaviour of vehicles by information processing from on-board sensors for assisting the driver in safety improvement. The vehicle that implements the invention is further called a host vehicle, and a vehicle travelling in the proximity of the host vehicle is called a neighbouring vehicle.

It is a constant necessity to improve the safety on road and to prevent accidents. Nowadays, vehicles, such as personal cars, are equipped with various sensors which allow characterizing the vehicle's position and motion. Further, some vehicles are also equipped with additional sensors which provide information about other vehicles travelling on the same road, which are called neighbouring vehicles. Such additional sensors include lidars, radars and cameras.

The challenge of preventing road accidents is to detect a volatile behaviour of travelling vehicles, which is indicative of an abnormal driving and an increased risk of road accidents. The detection of abnormal driving can be achieved by: (a) evaluating the own driver state and behaviour along with the vehicle motion parameters, and (b) detecting the abnormal driving of neighbouring vehicles, for example, their meandering or exceeding of the speed limit. In other words, the detection of abnormal driving requires self-awareness and awareness toward others.

The driving behaviour of a travelling vehicle is defined by such characteristics as the path travelled by the vehicle and the motion parameters of the vehicle. An abnormal driving behaviour can be defined by considering the host vehicle's travelling path and motion parameters alone, or in conjunction with its neighbouring vehicles' travelling paths and motion parameters observed.

A particular element which brings volatility to the traffic flow and may lead to road accidents is the meandering of vehicles on a road.

Some known methods use an on-board camera to detect the white-line marking of traffic lanes on the road surface. The images from the camera are then used to calculate the left-hand and right-hand deviations of the vehicle from the lane. However, such methods and systems require on-board cameras and powerful computing means to deal with a large amount of computation for image processing in real time.

A driving state monitoring apparatus is proposed in the U.S. Pat. No. 6,487,575, adapted to calculate a behaviour parameter indicative of the movement and speed of a vehicle. A linear regression of the changes of the behaviour parameter is used to set the regression line as a behaviour reference. A deviation of the vehicle is then computed according to the actual behaviour parameter, the behaviour reference, and the vehicle speed. The quantity of the deviation determines whether the driving state of the driver is proper. The road shape, either straight or curved with a substantially constant radius of curvature, is determined for deciding whether a quantity of lateral movement of the vehicle and, therefore, the driving state of the driver is abnormal. The apparatus proposed in this prior art does not involve an on-board camera, yet it requires substantial calculations, in particular to obtain the road curvature.

Additionally, this prior art does not consider neighbouring vehicles travelling on the road, and the linear regression is performed for the yaw angles of the vehicle.

It is an object of the present invention to provide a method and system to assess abnormal driving behaviour of vehicles travelling on a road to improve safety without the use of on-board cameras and image processing calculations, as compared to the prior art.

To this end, the invention proposes a method for assessment of abnormal driving behaviour of a vehicle travelling on a road, using position information and motion information about said vehicle. The method comprises the following steps:

- obtaining and memorizing a plurality of position information items and motion information items, each information item corresponding to a measuring time instant of an observation time interval,
- obtaining at least one estimate of a reference value for said vehicle travelling on said road during the observation time interval,
- calculating a set of deviation values, each deviation value being computed using a memorized information item corresponding to a measuring time instant and the at least one estimate of a reference value,
- obtaining a quantity of deviation from the set of deviation values to quantify a corresponding abnormal driving behaviour,
- repeating the above steps iteratively for monitoring the quantity of deviation for the corresponding abnormal driving behaviour, and
- deciding, based on said quantity of deviation, whether a predetermined threshold for the corresponding abnormal driving behaviour has been exceeded and in case of affirmative result, implementing a measure for safety improvement.

Advantageously, the invention provides a method for calculating a quantity of deviation of the driven host vehicle and/or of its neighbouring vehicles from the corresponding reference values, such as a reference path estimate, a maximum speed allowed on the road or a minimum safe inter-vehicle headway. The calculation is repeatedly carried out on successive time intervals.

According to particular characteristics, the method comprises one or several features as recited in the dependent claims.

According to another aspect, the invention concerns a system for assessment of abnormal driving behaviour of a vehicle travelling on a road, using position information items and motion information items about said vehicle and its neighbouring travelling vehicle or vehicles if any on said road, the system being characterized in that it comprises:

- a processing unit for obtaining a plurality of position information items and motion information items from on-board sensors of said vehicle about said vehicle, each information item corresponding to a measuring time instant of an observation time interval,
- a processing unit for obtaining a plurality of position information items and motion information items from on-board sensors of said vehicle about said neighbouring travelling vehicle or vehicles if any on said road, each information item corresponding to a measuring time instant of an observation time interval,
- a memorizing unit for memorizing a plurality of position information items and motion information items, each information item corresponding to a measuring time instant of an observation time interval, a reference values obtaining unit for obtaining at least one estimate of a reference value for said vehicle and said neighbouring vehicle or vehicles if any, travelling on said road during the observation time interval, a calculation unit adapted to calculate at least one set of deviation values, each deviation value being computed using a memorized information item corresponding to a measuring time instant and the at least one estimate of a reference value corresponding to the memorized information item, an assessment unit adapted to obtain a quantity of deviation for each set of deviation values, and a decision making unit, adapted to decide, based on said quantity of deviation, whether a predetermined threshold for the corresponding abnormal driving behaviour has been exceeded to trigger the implementation of a measure for safety improvement.

The invention will be better understood in the light of the detailed description and accompanying drawings listed below, which are only exemplary and by no way limiting:

Figure 1:
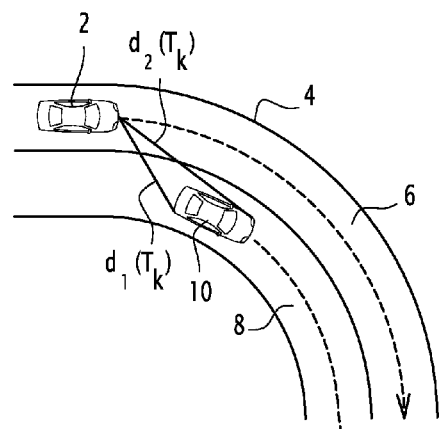
FIG. 1 represents schematically a host vehicle and its neighbouring vehicle travelling in the same direction on a multiple lane road at the same time instant.

The invention provides a method and system for assessing abnormal driving behaviour to improve driving safety of travelling vehicles, among them a vehicle implementing the method is labelled 2 in FIG. 1 and said vehicle is also called a host vehicle while a vehicle labelled 10 in FIG. 1 is called a neighbouring vehicle.

The host vehicle 2 is for example a car, equipped with various sensors, for example an odometer, a steering angle sensor, a lidar, a radar, an inertial sensor, which are not represented in FIG. 1. The host vehicle is travelling on a multiple lane road 4, which has lanes respectively labelled 6 and 8 in FIG. 1. The host vehicle 2 is travelling on lane 6, and a neighbouring vehicle 10 is running on lane 8, both said vehicles are moving in the same direction.

Figure 2:
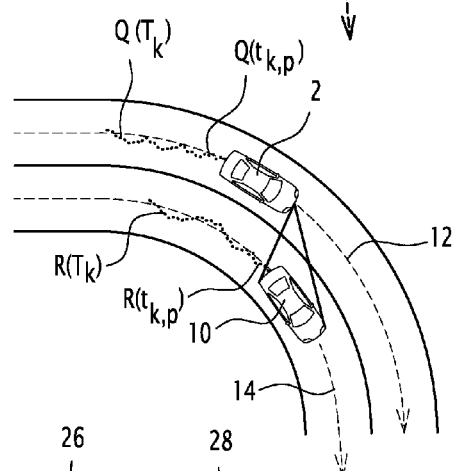
FIG. 2 shows a host vehicle and its neighbouring vehicle travelling on a road at a later time instant as compared to the representation of FIG. 1.

In the embodiment illustrated in FIG. 1, the host vehicle 2 is equipped with sensors which provide information on the neighbouring vehicle 10, travelling in the proximity of vehicle 2, on the lane 8. Only one neighbouring vehicle is depicted in FIG. 1, but the invention is not limited to a single neighbouring vehicle of the vehicle 2 which implements the method of the invention. The position of the vehicles is represented at a time instant $T_k$ in FIG. 1. The number of traffic lanes depicted in FIG. 1 and FIG. 2 is not limiting in either direction of travel.

In an embodiment, the sensors of the host vehicle 2 provide the speed and steering angle of said vehicle 2, which characterize the position of the host vehicle 2 in a known manner. Additionally, the host vehicle 2 may be equipped with a GPS (Global Positioning System), providing the coordinates of the vehicle in a global coordinate system. More generally, a host vehicle 2 is equipped with sensors providing position information items and motion information items of the vehicle itself and its neighbouring vehicles at measuring time instants. Each sensor provides measurements at an approximately regular sampling rate.

The host vehicle is also equipped with sensors, such as a lidar or a radar, providing the range distance between the host vehicle 2 and the neighbouring vehicle 10 and allowing for speed calculation of the neighbouring vehicle 10. For example, as shown in FIG. 2, distance $d_1(T_k)$ between the centre of the front end of vehicle 2 and the right-hand back corner of vehicle 10 and distance $d_2(T_k)$ between the centre of the front end of vehicle 2 and the left-hand front corner of vehicle 10 are provided.

The sampling period of the system according to the present method is denoted as $\tau$ in relation to position and speed information about the travelling vehicles, for example $\tau=50$ ms.

FIG. 1 shows the position of two vehicles, respectively host vehicle 2 and its neighbouring vehicle 10 at time instant $T_k$. FIG. 2 illustrates the position of the same two vehicles, respectively host vehicle 2 and neighbouring vehicle 10, at a later time instant $T_{k+1}>T_k$. The period of time $[T_k, T_{k+1}]$ forms an observation time interval, wherein n measurements are being captured by the sensors on-board of vehicle 2 during the observation time interval.

The position information items representative of the measured positions of the travelling vehicles are depicted by dots in FIG. 2. For example, $Q(T_k)$ is the position of vehicle 2 at time instant $T_k$, and $Q(t_{k,p})$ is the position of vehicle 2 at instant $t_{k,p}=T_k+(p-1)\tau$, $p=1,\ldots,n$. Similarly, $R(T_k)$ is the position of vehicle 10 at time instant $T_k$ and $R(t_{k,p})$ is the position of vehicle 10 at instant $t_{k,p}=T_k+(p-1)\tau$, $p=1,\ldots,n$.

The reference paths, which are representative of the road lanes are schematically depicted as arrowed curves 12, 14 in FIG. 2.

The positions obtained from measurements show the deviation of each vehicle as compared to the respective travelled segments of reference paths 12, 14.

The precise reference paths are not known and not accessible to a vehicle.

In an embodiment of the invention, it is proposed to obtain an estimate of a reference path that a vehicle had already travelled during an observation time interval, and to compute a quantity of deviation of the real path of the vehicle from the estimated reference path.

Figure 3:
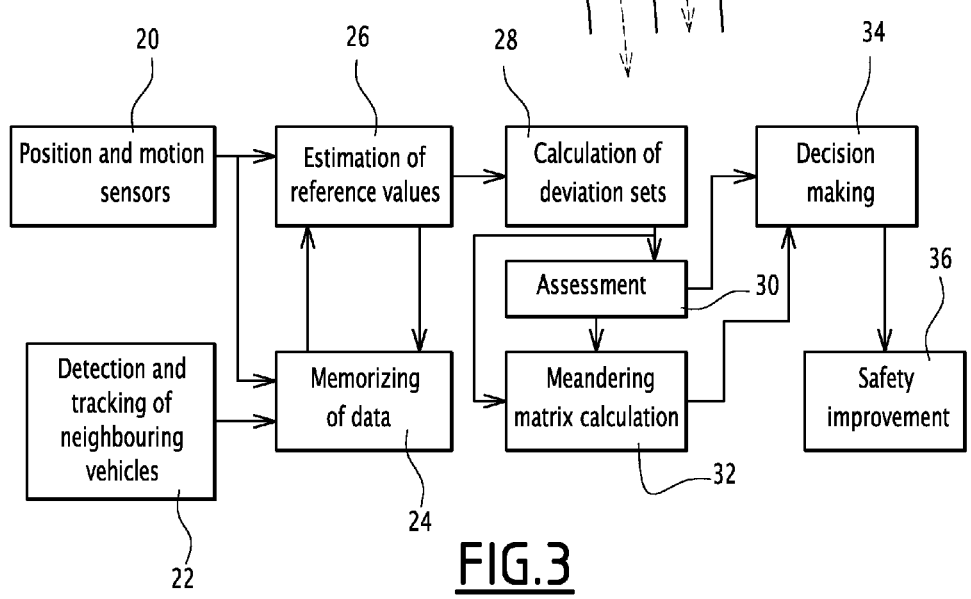
FIG. 3 is a functional block diagram of a system according to the invention.

FIG. 3 represents a block diagram of various functional units of a system according to the invention.

A host vehicle 2 comprises one or several position and motion sensors 20 of the vehicle itself. In an embodiment, the sensors 20 comprise a speed sensor and a steering angle sensor, which are adapted to capture measurements at the approximately same time instants.

Optionally, the host vehicle may comprise one or several sensors 22 to detect and track neighbouring vehicles, in particular adapted to capture the distance to and the speed of a neighbouring vehicle, as illustrated in FIGS. 1 and 2.

The measurements provided by the sensors 20, 22 are stored in a memorizing unit 24 of a host vehicle 2.

The host vehicle 2 further comprises a reference values estimation unit 26, which obtains reference values for an observation time interval as explained in detail hereafter.

In a first embodiment, the reference values are computed from a subset of the memorized position and motion information, to estimate a reference path for a host vehicle 2 and a reference path for each neighbouring vehicle for an observation time interval. In this embodiment, an abnormal driving behaviour is meandering of the vehicle with respect to the estimated reference path.

In a second embodiment, a reference value is a maximum speed value allowed on a road or a speed value estimate of the traffic flow for the observation time interval. In this embodiment, a corresponding abnormal driving behaviour is excess speeding.

In a third embodiment, a reference value is a minimum range distance known as safe inter-vehicle headway between two vehicles travelling in the same lane and in the same direction, and maintaining a greater distance than said safe inter-vehicle headway ensures collision-free motion. In this embodiment, a corresponding abnormal driving behaviour is non respect of the safe inter-vehicle headway.

The reference values are stored in the memorizing unit 24.

Further, the host vehicle comprises a unit 28 for calculation of the sets of deviation values, where each set is representative of the corresponding driving behaviour and each deviation value corresponds to a measuring time instant of the observation time interval, as explained in more detail hereafter with respect to the various embodiments.

An assessment unit 30 provides the quantities of deviations from the respective reference values corresponding to the relevant driving behaviours during the observation time interval.

Indeed, if the sensors 22 are present and if one or several neighbouring vehicles have travelled in the neighbourhood of a host vehicle 2 during the observation time interval, then the assessment unit 30 computes the deviations quantities for the relevant driving behaviours of each neighbouring vehicle and, in relation to meandering of vehicles, a meandering matrix calculation unit 32 computes a meandering matrix for the host vehicle, which contains the deviation covariance of every two vehicles considered. Advantageously, the invention allows to apply awareness to neighbouring vehicles and to decrease the overall risk of accident on the road.

The result of the assessment unit 30 and/or of the meandering matrix calculation unit 32, is transmitted to a decision making unit 34, which is adapted to check if a quantity of deviation for the relevant driving behaviour has exceeded a predetermined threshold during the observation time interval. The decision making unit 34 performs a statistical hypothesis testing according to a predetermined threshold probability known as a significance level, in order to decide whether the null hypothesis about a driving behaviour is rejected according to at least one significance level, for example 5% or 1%, and therefore an abnormal driving behaviour is detected, or otherwise one cannot reject the null hypothesis given the observed data.

The decision making unit 34 is connected to a safety improvement unit 36.

The reference values estimation unit 26, the unit 28 for calculation of the sets of deviation values, the assessment unit 30, the meandering matrix calculation unit 32 and the decision making unit 34 are implemented by computing means, for example an on-board computer of a host vehicle 2.

In an embodiment, the safety improvement means 36 of a host vehicle 2 are adapted to raise an alarm, for example a visual alarm is displayed or an audio alarm is issued to alert the driver.

In an alternative embodiment, the safety improvement means 36 trigger a driver assistance system to take control of a host vehicle 2.

Figure 4:
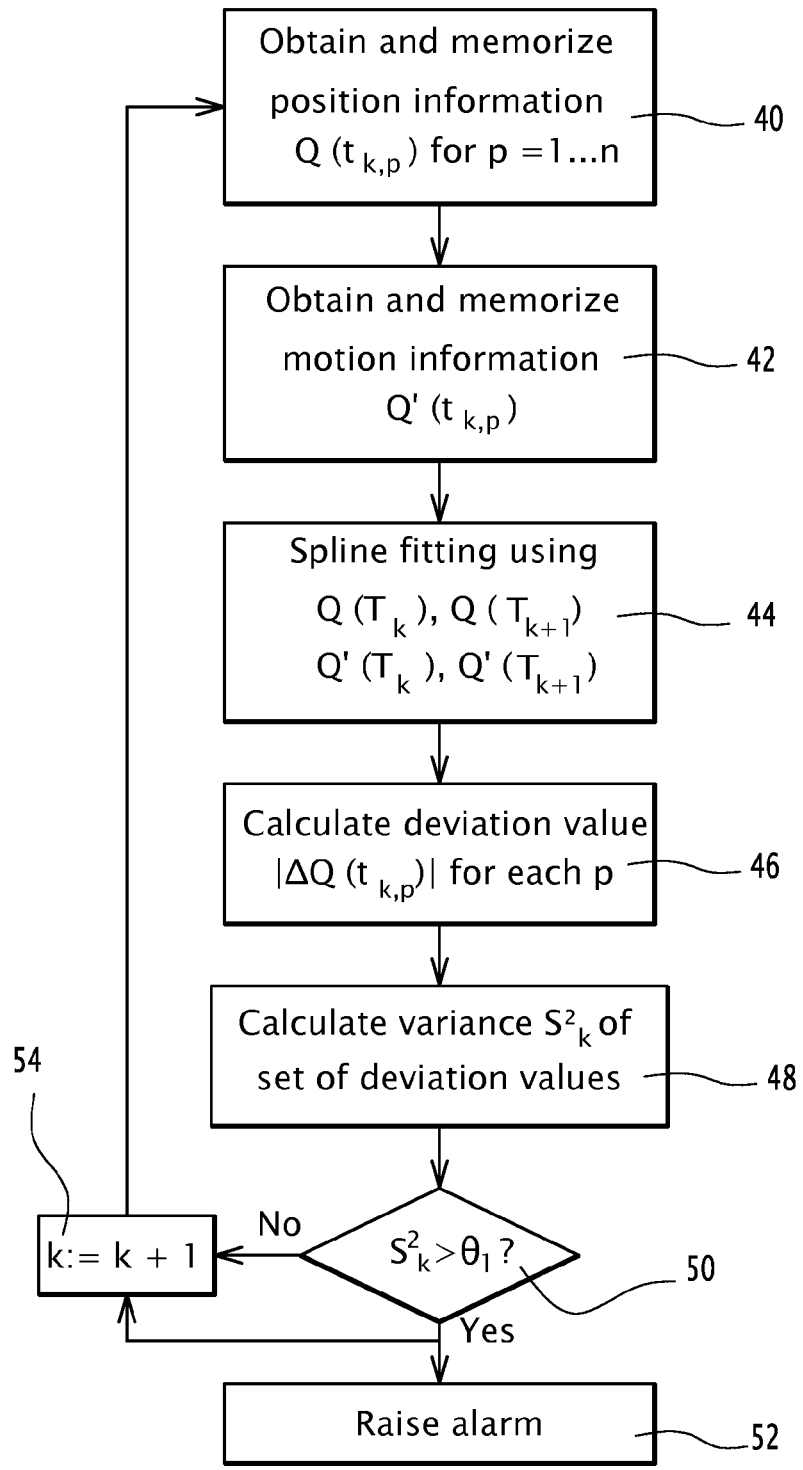
FIG. 4 is a flowchart of meandering calculation for improving driving safety according to a first embodiment of the invention.

FIG. 4 is a flowchart detailing the implementation of a first embodiment of the invention, wherein the reference values are estimates of the path travelled by the vehicle.

In a first step 40, a set of position information items $Q(t_{k,p})$ defining the position of the host vehicle implementing the method are obtained and memorized, for a current observation time interval considered, $[T_k, T_{k+1}]$ The position Q(t) of the vehicle at a given time instant t is a two-dimensional vector composed of the vehicle coordinates x(t), y(t) in a predetermined spatial referential. If the on-board sensors provide an information relative to the steering angle and speed at given time instants $t_{k,p}$; the measured values are transformed into coordinates $X(t_{k,p})$, $y(t_{k,p})$ by calculation.

The position information items $Q(t_{k,p})$, with p varying from 1 to n, $t_{k,p}$ varying from the starting time $T_k=t_{k,1}$ to the ending time $T_{k+1}=t_{k,n}=t_k+(n-1)\tau$ of the observation time interval $[T_k, T_{k+1}]$ are stored. The time instants $t_{k,p}$ are called measuring time instants.

Similarly, the motion information is obtained at step 42. Preferably the motion information items are two-dimensional speed vectors $Q'(t_{k,p})$ of the host vehicle 2, at measuring time instants $t_{k,p}$.

Next, an estimation of the reference path travelled by the host vehicle for the observation time interval is computed in the curve fitting step 44. In an embodiment, the curve chosen to represent the path is a smooth spline P(t), also known as cubic spline, which is a continuous curve on the time interval $[T_k, T_{k+1}]$ The derivative of the curve P(t), noted P'(t), is also continuous on the time interval $[T_k, T_{k+1}]$.

The spline curve P(t) is fitted based on the boundary conditions, i.e. the measured position information values and motion information values at the starting and ending time instants, respectively $T_k$ and $T_{k+1}$, corresponding to the observation time interval. Therefore only a subset of the stored position information items and motion information items are used for the estimation of the reference curve.

In an embodiment, the smooth spline is defined by the following equation:

$$P(t) = \sum_{j=0}^{3} B_j \left(\frac{t - T_k}{T_{k+1} - T_k}\right)^j,$$

where to $t \in [T_k, T_{k+1}]$, k=0, 1, . . . . This definition of a smooth spline is not limiting to the above formula and other definitions are possible.

The spline P(t) and the coefficients $B_j$ are two-dimensional vectors defining an estimate of the reference (x,y)-path travelled by the vehicle during the observation time interval $[T_k, T_{k+1}]$ The following and not limiting boundary conditions can be used to calculate the coefficients $B_j$:

$P(T_k)=Q(T_k)$, $P'(T_k)=Q'(T_k)$, $P(T_{k+1})=Q(T_{k+1})$, $P'(T_{k+1})=Q'(T_{k+1})$.

Once the coefficients $B_j$ are computed, the estimated reference path $P(t_{k,p})$ or its respective position in the spatial referential considered at any time instant $t_{k,p}$ of the observation time interval can be computed.

A set of deviation values $|\Delta Q(t_{k,p})|=|P(t_{k,p})-Q(t_{k,p})|$ representative of the deviation of the actual path travelled by the vehicle from the estimated reference path P(t), $t \in [T_k, T_{k+1}]$ is next computed at step 46, for each p between 1 and n. The difference $\Delta Q(t_{k,p})=P(t_{k,p})-Q(t_{k,p})$ is a two-dimensional vector, and a corresponding deviation value $\Delta Q(t_{k,p})$ is for example the L2 norm of said vector. Alternatively, another norm such as the L1 norm may be used. More generally, each deviation value is computed as a distance between a memorized position information item $Q(t_{k,p})$ and the corresponding estimate reference position of the reference path $P(t_{k,p})$.

By construction, the respective deviation values at the boundaries of the observation time interval are equal to zero.

Alternatively, the reference path is represented by a smooth spline of a different order, or different boundary conditions are used.

In another alternative embodiment, the reference path is represented by a regression curve.

Next, a quantity of deviation of the vehicle from the estimated reference path is computed at step 48.

The sample mean $m_k(\Delta Q)$ of the set of deviation values $\{|\Delta Q(t_{k,p})|, p=1, \ldots, n\}$ is computed as $$m_k(\Delta Q) = \frac{1}{n}\sum_{p=1}^{n} |\Delta Q(t_{k,p})|,$$

and then the sample variance $s_k^2(\Delta Q)$ of the set of deviation values for the observation time interval $[T_k, T_{k+1}]$ is computed as:

$$s_k^2(\Delta Q) = \frac{1}{n-1}\sum_{p=1}^{n} [|\Delta Q(t_{k,p})| - m_k(\Delta Q)]^2.$$

The sample variance $s_k^2(\Delta Q)$ is an estimate of the vehicle meandering on the observation time interval $[T_k, T_{k+1}]$. In other words, the meandering is quantified by computing the sample variance of the vehicle deviation from a reference path estimate during a short time period.

Furthermore, another statistical measure of the amount of deviation for the set of deviation values $|\Delta Q(t_{k,p})|$, such as the standard deviation, is used as an estimate of the vehicle meandering. Additionally, other statistical measures such as a sample skewness (known as a third moment) and a sample kurtosis (known as a fourth moment) can also be used to evaluate the vehicle meandering.

In an embodiment, the vehicle meandering is calculated using the sample variance of the set of deviation values, while the sample skewness and the sample kurtosis of the set of deviation values are supplementary.

The quantity of deviation given by the sample variance $s_k^2(\Delta Q)$ is then compared to a predetermined threshold $\theta_1$ corresponding to the meandering behaviour.

In an embodiment, the threshold $\theta_1$ depends on the vehicle speed during the observation interval, since the higher the speed, the lower the tolerated deviation. For example, the threshold $\theta_1$ is obtained from measurements as a heuristic value or is represented by a non-linear function.

If the computed quantity of deviation given by the sample variance $s_k^2(\Delta Q)$ is greater than $\theta_1$, then an alarm is raised in step 52.

Whether or not an alarm is raised, step 50 is followed by a step 54 of incrementing the value k by 1, therefore triggering the processing of a subsequent observation time interval. Step 54 is followed by step 40 already described.

In practice, the obtaining and memorizing of position and motion information at regularly spaced measuring instants is preferably carried out as a background task, and memorized information items, corresponding to an observation time interval already processed may be erased from the memory. The observation time intervals processed are successive and their duration may vary.

In an alternative embodiment, the observation time intervals are partially overlapped or spaced in time.

The sample variances obtained for multiple observation intervals may be used in combination for comparing with the predetermined threshold $\theta_1$. Analogously, the values of sample skewness obtained for multiple observation intervals can be used in combination. Analogously, the values of sample kurtosis obtained for multiple observation intervals can also be used in combination.

Advantageously, even though the estimate reference path computed is approximate, using short successive observation time intervals brings a good estimation of meandering. For example, if the sensors provide position and speed information every 50 ms, an observation period of 5 seconds allows acquiring a hundred measurements. If the vehicle travels at an average speed of 90 km/h, the observation time interval corresponds to 125 meters travelled by the vehicle. Therefore, the proposed method allows monitoring the vehicle meandering on short travelled distances.

Preferably, the observation time interval is chosen so as to contain a statistically significant number of measurements, for example $n \geq 30$ and preferably $n \geq 100$.

Further, given that the observation time intervals considered are short, the method further allows using position and motion information regarding neighbouring vehicles, which can be monitored by sensors. For example, some available lidars provide a maximal range of 200 meters, therefore a neighbouring vehicle 10 can be monitored if it remains at a distance smaller than 200 meters from the host vehicle 2.

Let us denote $Veh_0$ a host vehicle such as vehicle 2 of FIGS. 1 and 2 and $Veh_i$ a neighbouring vehicle of host vehicle 2, such as vehicle 10 of FIGS. 1 and 2.

Figures 5, 6:
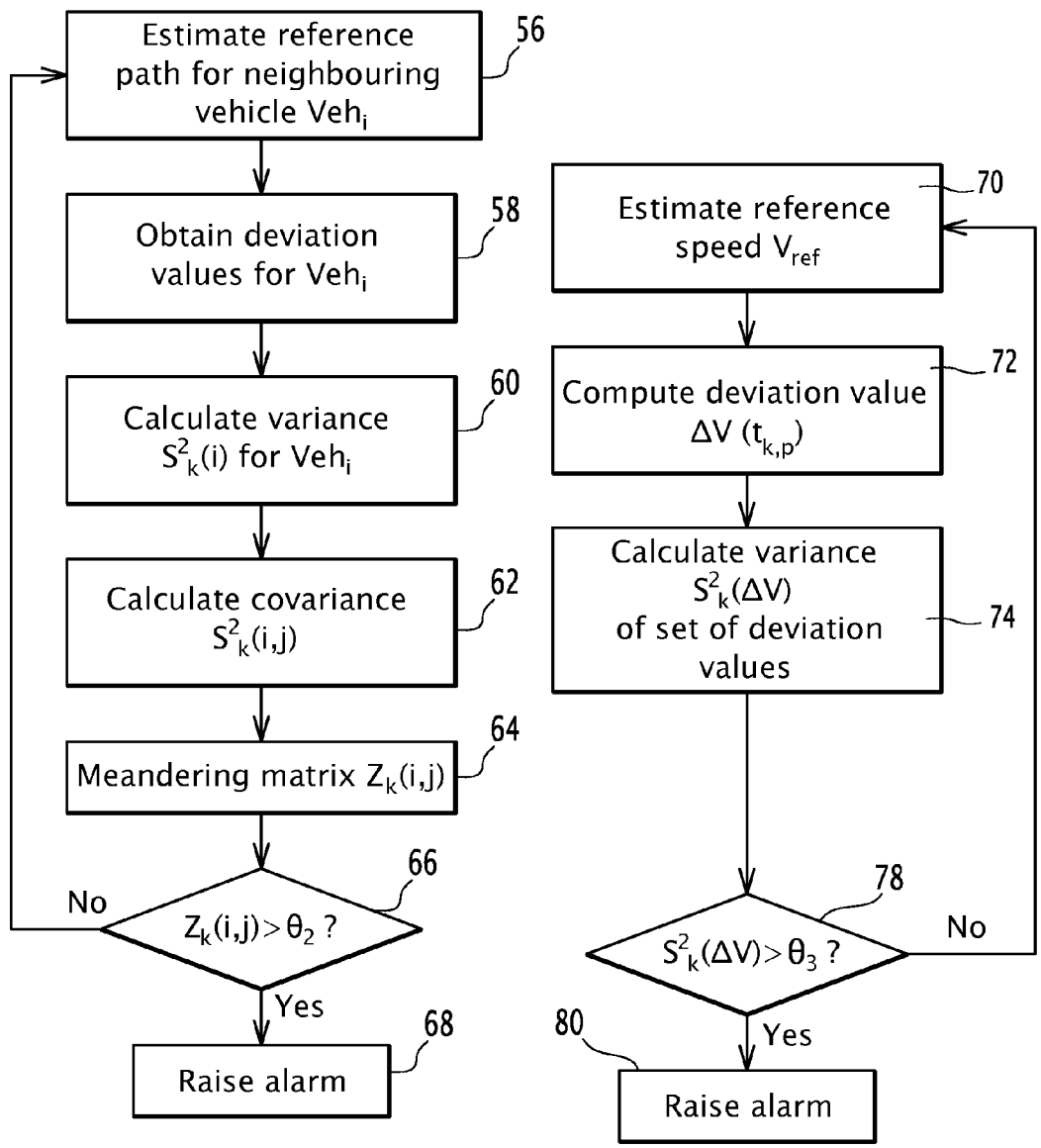
FIG. 5 is a flowchart of a meandering matrix calculation according to an embodiment of the invention.
FIG. 6 is a flowchart of a speed excess calculation according to a second embodiment of the invention.

As illustrated in FIG. 5, steps analogous to steps 40 to 48 of FIG. 4 are implemented to obtain an estimated reference path travelled by the neighbouring vehicle $Veh_i$ (step 56), a set of deviation values for the vehicle $Veh_i$ (step 58) and a sample variance of deviation $s_k^2(i)$ (step 60) for each observation time interval $[T_k, T_{k+1}]$.

Other measures such as the sample skewness or the sample kurtosis of the set of deviation values can also be computed.

Given that a set of deviation values during the observation time interval is obtained for each vehicle and the meandering calculation is performed on-board of the host vehicle $Veh_0$, a meandering matrix for the host vehicle $Veh_0$ can be constructed. The meandering matrix contains the sample variance of deviation values for the host vehicle and its neighbouring vehicles on its main diagonal, and the non-diagonal values of said matrix are covariances $s_k^2(i,j)$ (step 62) computed between the respective sets of deviation values associated to vehicles $Veh_i$ and $Veh_j$, travelling on the road.

Therefore, the meandering matrix obtained (step 64) contains the sample variance of deviation values on its main diagonal for the host vehicle and for each neighbouring vehicle if any, and the covariances represent the interdependence of motion between vehicle $Veh_i$ and vehicle $Veh_j$ for each observation time interval. These covariances may serve, in particular, for safety evaluation of the vehicles travelling as a group on a road. If the covariance between the neighbouring vehicles Veh$_i$ and Veh$_j$ is greater than a threshold $\theta_2$ (step 66), this indicates a degree of interdependence of said vehicles in relation to meandering, and an alarm is issued (step 68) to the driver of the vehicle that implements the proposed method. Optionally, the alarm may also be communicated to the drivers of vehicle Veh$_i$ and vehicle Veh$_j$ in order to alert them.

According to a second embodiment, illustrated by the flowchart of FIG. 6, the reference value $V_{ref}$ is a maximum speed allowed on the road where the vehicles are travelling or a speed of the traffic flow.

It is assumed that the motion information sensors on-board of a host vehicle provide instant speed information for said vehicle itself and for its neighbouring vehicles at each measuring time instant during the observation time interval. A first step 70 of the method consists in obtaining and memorizing a reference speed value $V_{ref}$ for the observation time interval. Such a value may be obtained automatically from a driver assistance system or a vehicle-to-infrastructure communication system or, for example, be set manually by the driver according to the speed limit of the road. Next, a set of deviation values is computed at step 72 for each observation interval, that is to say each deviation value is calculated at time instant $t_{k,p} = T_k + (p-1)\tau$, $p = 1, \ldots, n$ according to the following formula:

$$\Delta V(t_{k,p}) = \begin{cases} V(t_{k,p}) - V_{ref}, & \text{if } V_{ref} < V(t_{k,p}) \\ 0, & \text{if } V_{ref} \geq V(t_{k,p}) \end{cases}.$$

Advantageously, only the measured instant speed values which are greater than the reference speed value are actually taken into account.

Next, at step 74, a sample variance of speed deviation is computed for the set of deviation values $\{\Delta V(t_{k,p}), p = 1, \ldots, n\}$ for each observation time interval.

Next, step 78, analogous to step 50 previously described, is implemented, wherein the computed variance is compared to a threshold $\theta_3$ which is a speed deviation variance threshold. Preferably, this threshold $\theta_3$ depends on the reference speed value on said road. If the speed deviation variance computed is greater than the speed deviation variance threshold, an alarm is raised (step 80) analogously to step 52 previously described.

Optionally, the reference speed value $V_{ref}$ is a speed value of the traffic flow where the host vehicle is moving, for example an average or mean speed of the traffic flow.

According to a third embodiment, the method aims at avoiding collision between a host vehicle and a neighbouring vehicle, both travelling in the same lane and in the same direction. In the third embodiment, the reference values are representative of a minimum safe range distance value between a host vehicle and a neighbouring vehicle.

In this third embodiment, the sensors of a host vehicle provide instant speed $V(t_{k,p})$ information of said vehicle and range distance $D(t_{k,p})$ between said vehicle and a neighbouring vehicle at measuring time instants $t_{k,p}$.

Figure 7:
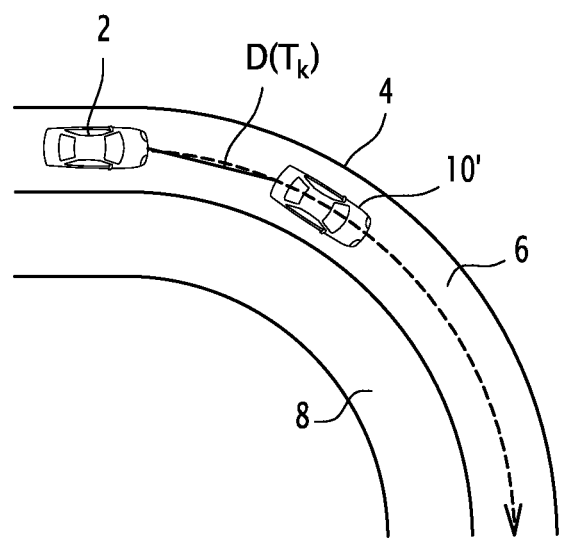
FIG. 7 represents schematically a host vehicle and its neighbouring vehicle travelling in the same direction on the same lane of a road at the same time instant.

As shown schematically in FIG. 7, the host vehicle 2 is equipped with sensors which provide information on the neighbouring vehicle 10', travelling on the same lane 6 of road 4 as the host vehicle 2. The sensors provide a range distance $D(T_k)$ at time instant $T_k$ between the host vehicle 2 and the neighbouring vehicle 10', travelling in front of host vehicle 2. To ensure safety, the distance $D(t_{k,p})$ should be, at any time instant, above a minimum safe range distance between a host vehicle and a neighbouring vehicle travelling in the same lane and in the same direction ahead of the host vehicle, called a safe inter-vehicle headway. According to an embodiment, the safe inter-vehicle headway is given by the formula:

$$D_s(t_{k,p}) = D_0 + V(t_{k,p})C_s,$$

where $D_0$ is a constant safety spacing between vehicles, $C_s$ is a predetermined constant.

A set of deviation values from the instant minimum range distance is computed as follows:

$$\Delta D(t_{k,p}) = \begin{cases} D_s(t_{k,p}) - D(t_{k,p}), & \text{if } D_s(t_{k,p}) > D(t_{k,p}) \\ 0, & \text{if } D_s(t_{k,p}) \leq D(t_{k,p}) \end{cases}.$$

Advantageously, a positive deviation value is computed only when the inter-vehicle distance $D(t_{k,p})$ is smaller than a safe inter-vehicle headway $D_s(t_{k,p})$.

Once the set of deviation values is computed, as previously explained, a sample mean and a sample variance are computed, and the sample variance is used as a quantity of inter-vehicle headway deviation with respect to the safe inter-vehicle distance. The quantity of inter-vehicle headway deviation is compared to a corresponding heuristic threshold, and an alert can therefore be triggered if necessary.

Similarly to an example of FIG. 7, the neighbouring vehicle travels behind the host vehicle whose rear sensors provide an inter-vehicle headway between the host vehicle and its neighbouring vehicle.

According to an alternative embodiment, the sets of deviations $\Delta Q$, $\Delta V$ and $\Delta D$ are computed for the host vehicle and for each of its neighbouring vehicles, so that a vector of variances is obtained for each vehicle.

In overall, the volatility of a travelling vehicle and a driving behaviour is associated with the variance of the vehicle deviation from the corresponding reference estimates. Therefore, the assessment of abnormal driving behaviour is achieved by observing and monitoring of the travelling vehicles and by evaluating a sample variance of the deviation between the actual motion parameters and their reference estimates during a short time period. The variance calculation of the relevant motion parameters is repeated iteratively to quantify the volatility of driving behaviour of a vehicle during subsequent time periods.

The invention claimed is:

1. A method for assessment of abnormal driving behaviour of a vehicle travelling on a road, using position information and motion information about said vehicle, the method being characterized in that it comprises the following steps:

obtaining and memorizing a plurality of position information items and motion information items, wherein the plurality of position information items and motion information items are measured by at least one sensor, each position information item and motion information item corresponding to a measuring time instant of an observation time interval, and wherein each motion information item is an instant speed value at the corresponding measuring time instant, obtaining at least one estimate of a reference value for said vehicle travelling on said road during the observation time interval, wherein said at least one estimate of a reference value is a reference speed value during the observation time interval, calculating, with a computer, a set of deviation values, each deviation value being computed using a memorized motion information item at a corresponding measuring time instant and the at least one estimate of a reference value, and wherein each deviation value at a given measuring time instant being equal to a difference between the instant speed value at said given measuring time instant and the reference speed value at said given measuring time instant if the instant speed value at said given measuring time instant is greater than the reference speed value, and the deviation value at said given measuring time instant being equal to zero otherwise, obtaining a quantity of deviation from the set of deviation values to quantify a corresponding abnormal driving behaviour, repeating the steps of obtaining and memorizing, obtaining at least one estimate, calculating a set of deviation values, and obtaining a quantity of deviation iteratively for monitoring the quantity of deviation for the corresponding abnormal driving behaviour, and deciding, based on said quantity of deviation, whether a predetermined threshold for the corresponding abnormal driving behaviour has been exceeded and in case of affirmative result, implementing a measure for safety improvement.

2. A method according to claim 1, wherein said quantity of deviation is computed as a sample variance.

3. A method according to claim 1, wherein the obtaining of a quantity of deviation comprises the calculation of skewness or kurtosis of the set of deviation values.

4. A method according to claim 1, wherein the step of implementing a measure of safety improvement comprises raising an audio alarm and/or a visual alarm to assist the driver of said vehicle implementing the method.

5. A method according to claim 1, wherein the step of implementing a measure of safety improvement comprises triggering a driver assistance system to take control of said vehicle implementing the method.

6. A method according to claim 1, wherein the plurality of position information items and motion information items are provided at measuring instants being approximately regularly sampled, and wherein said observation time interval is dependent on the vehicle's speed, and wherein said observation time interval is set to contain a number of information items greater than predetermined minimum number.

7. A method for assessment of abnormal driving behaviour of a vehicle travelling on a road, using position information and motion information about said vehicle, the method being characterized in that it comprises the following steps:

obtaining and memorizing a plurality of position information items and motion information items, wherein the plurality of position information items and motion information items are measured by at least one sensor, each position information item and motion information item corresponding to a measuring time instant of an observation time interval, obtaining at least one estimate of a reference value for said vehicle travelling on said road during the observation time interval, calculating, with a computer, a set of deviation values, each deviation value being computed using a memorized position information item at a corresponding measuring time instant and the at least one estimate of a reference value, obtaining a quantity of deviation from the set of deviation values to quantify a corresponding abnormal driving behaviour, repeating the steps of obtaining and memorizing, obtaining at least one estimate, calculating a set of deviation values, and obtaining a quantity of deviation iteratively for monitoring the quantity of deviation for the corresponding abnormal driving behaviour, deciding, based on said quantity of deviation, whether a predetermined threshold for the corresponding abnormal driving behaviour has been exceeded and in case of affirmative result, implementing a measure for safety improvement, and wherein the step of obtaining at least one estimate of a reference value comprises obtaining a plurality of coefficient values defining an estimate of a reference path travelled during said observation time interval, said plurality of coefficient values being computed using a subset of the memorized plurality of position information items and motion information items.

8. A method according to claim 7, wherein a deviation value at an associated measuring time instant is equal to a distance between the corresponding memorized position information item and a reference position corresponding to said associated measuring time instant on the estimated reference path, so as to obtain the set of deviation values.

9. A method according to claim 7, wherein the observation time interval is defined by a starting time instant and an ending time instant, and wherein said estimated reference path is modelled by a curve, and wherein the step of obtaining a plurality of coefficient values comprising a curve fitting using the vehicle position and motion information at the starting time instant and the vehicle position and motion information at the ending time instant.

10. A method according to claim 7, wherein said quantity of deviation is computed as a sample variance.

11. A method according to claim 7, wherein the obtaining of a quantity of deviation comprises the calculation of skewness or kurtosis of the set of deviation values.

12. A method for assessment of abnormal driving behaviour of a vehicle travelling on a road, using position information and motion information about said vehicle and position information and motion information about at least one neighbouring vehicle of said vehicle implementing the method, travelling on said road, the method comprising the following steps:

obtaining and memorizing a plurality of position information items and motion information items, each position information item and motion information item corresponding to a measuring time instant of an observation time interval, obtaining and memorizing a plurality of items of information relative to the position and speed of at least one neighbouring vehicle during the observation time interval, obtaining at least one estimate of a first reference value for said vehicle travelling on said road during the observation time interval, obtaining at least one estimate of a second reference value for said at least one neighbouring vehicle during the observation time interval, calculating, with a computer, a first set of deviation values, each deviation value of the first set of deviation values being computed using a memorized position information item at a corresponding measuring time instant and the at least one estimate of a first reference value, calculating, with a computer, a second set of deviation values, each deviation value of the second set of deviation values being computed using a memorized item of information relative to the position of said at least one neighbouring vehicle at a corresponding measuring time instant and the at least one estimate of a second reference value, obtaining a first quantity of deviation from the first set of deviation values to quantify a corresponding abnormal driving behaviour, obtaining a second quantity of deviation from the second set of deviation values to quantify a corresponding abnormal driving behaviour of said at least one neighbouring vehicle, repeating the steps of obtaining and memorizing a plurality of position information items and motion information item, obtaining at least one estimate of a first reference value, calculating a first set of deviation values, and obtaining a first quantity of deviation iteratively for monitoring the first quantity of deviation for the corresponding abnormal driving behaviour, repeating the steps of obtaining and memorizing a plurality of items of information relative to the position and speed of said neighbouring vehicle, obtaining at least one estimate of a second reference value, calculating a second set of deviation values and obtaining a second quantity of deviation iteratively for monitoring the second quantity of deviation for the corresponding abnormal driving behaviour of said at least one neighbouring vehicle, deciding, based on said first quantity of deviation, whether a first predetermined threshold for the corresponding abnormal driving behaviour has been exceeded and in case of affirmative result, implementing a measure for safety improvement, and deciding, based on said second quantity of deviation, whether a second predetermined threshold for the corresponding abnormal driving behaviour of said neighbouring vehicle has been exceeded and in case of affirmative result, implementing the measure for safety improvement.

13. A method according to claim 5, further comprising a step of calculating a matrix representative of a meandering of said vehicle and of said at least one neighbouring vehicle, and a step of implementing the measure for safety improvement if at least one value of said meandering matrix is greater than a predetermined threshold corresponding to an abnormal meandering behaviour.

14. A method according to claim 5, wherein speed information relative to said vehicle and range distance information relative to at least one neighbouring vehicle are available, and wherein said estimate of a second reference value is a minimum safe range distance value computed for each corresponding measuring time instant depending on instant speed information at said corresponding measuring time instant, and wherein a deviation value of the second set of deviation values at a given measuring time instant being equal to the difference between the minimum safe range distance value computed for said given measuring time instant and the measured range distance between said vehicle and said neighbouring vehicle at said given measuring time instant if said measured range distance is smaller than said minimum safe range distance at said given measuring time instant, and the deviation value of the second set of deviation values at the given measuring time instant being equal to zero otherwise.

15. A method according to claim 12, wherein said first quantity of deviation and said second quantity of deviation are computed as a sample variance.

16. A method according to claim 15, wherein the obtaining of the first quantity of deviation comprises calculation of skewness or kurtosis of the first set of deviation values, and wherein the obtaining of the second quantity of deviation comprises calculation of skewness or kurtosis of the second set of deviation values.

17. A system for assessment of abnormal driving behaviour of a vehicle travelling on a road, the system being characterized in that it comprises:

a processing unit for obtaining a plurality of first position information items and first motion information items from on-board sensors of said vehicle about said vehicle, each first position information item and first motion information item corresponding to a measuring time instant of an observation time interval, a processing unit for obtaining a plurality of second position information items and second motion information items from on-board sensors of said vehicle about at least one neighbouring travelling vehicle on said road, each second position information item and second motion information item corresponding to a measuring time instant of an observation time interval, a memorizing unit for memorizing the plurality of first position information items and first motion information items and the plurality of second position items and second motion items, a reference values obtaining unit for obtaining at least one estimate of a first reference value for said vehicle and at least one estimate of a second reference value for said at least one neighbouring vehicle travelling on said road during the observation time interval, a calculation unit adapted to calculate a first set of deviation values and a second set of deviation values, each deviation value of the first set of deviation values being computed using a memorized first position information item at a corresponding measuring time instant and the at least one estimate of a first reference value corresponding to the memorized first position information item, each deviation value of the second set of deviation values being computed using a memorized second position information item at a corresponding measuring time instant and the at least one estimate of a second reference value corresponding to the memorized second position information item, an assessment unit adapted to obtain a first quantity of deviation for the first set of deviation values and a second quantity of deviation for the second set of deviation values, and a decision making unit, adapted to decide, based on at least one of said first quantity of deviation or said second quantity of deviation, whether a predetermined threshold for a corresponding abnormal driving behaviour has been exceeded to trigger the implementation of a measure for safety improvement.

18. A system for assessment of abnormal driving behaviour of a vehicle travelling on a road according to claim 17, further comprising a meandering matrix calculation unit for obtaining a matrix containing quantities of deviation representative of a meandering of said vehicle and of said at least one neighbouring vehicle.

* * * * *